Feb. 3, 1953 N. F. MARZOLF 2,627,140
EGG SCOURING MACHINE
Filed Sept. 28, 1948 3 Sheets-Sheet 1

Inventor
NORBERT F. MARZOLF
Attorney

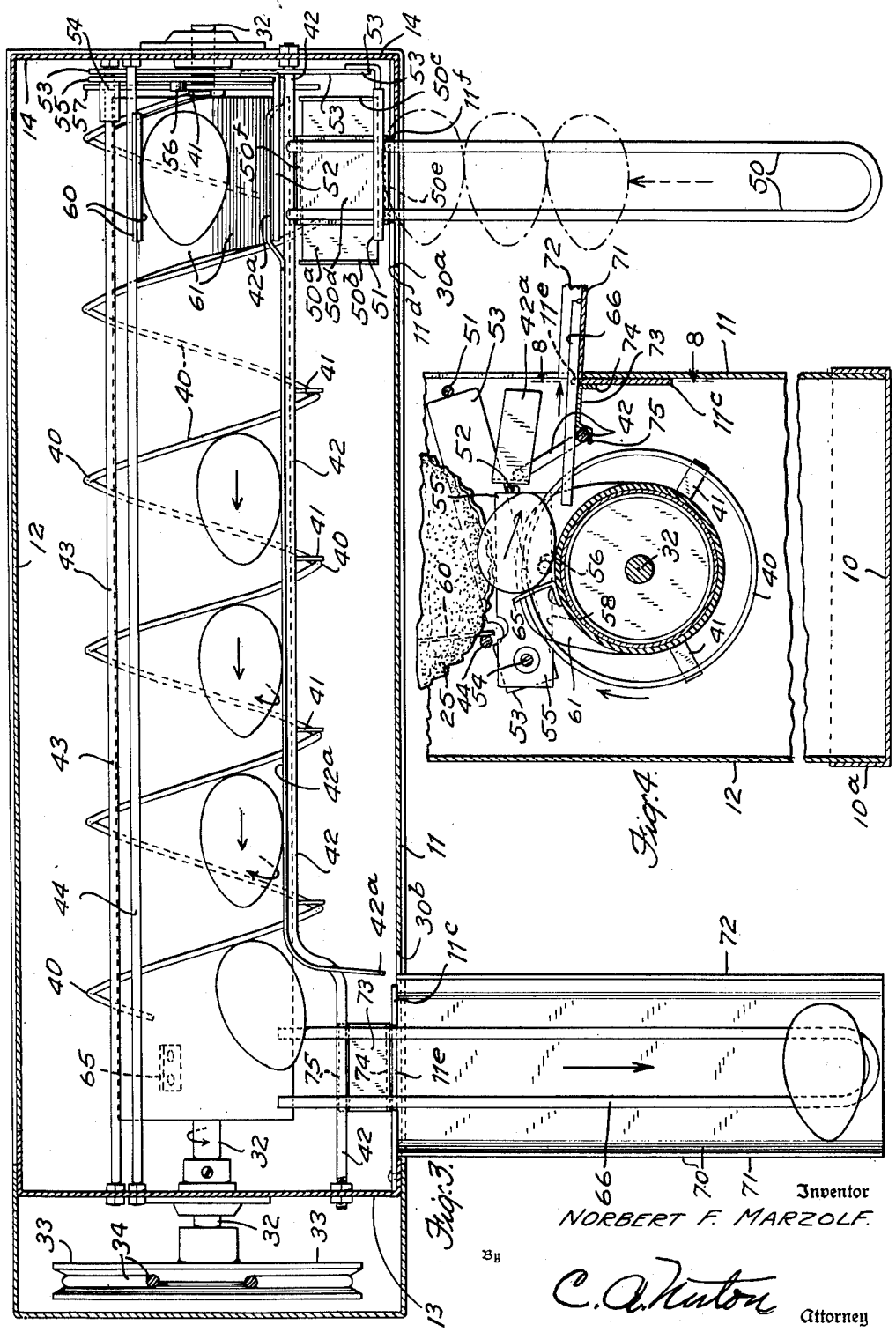

Feb. 3, 1953     N. F. MARZOLF     2,627,140
EGG SCOURING MACHINE
Filed Sept. 28, 1948     3 Sheets-Sheet 3
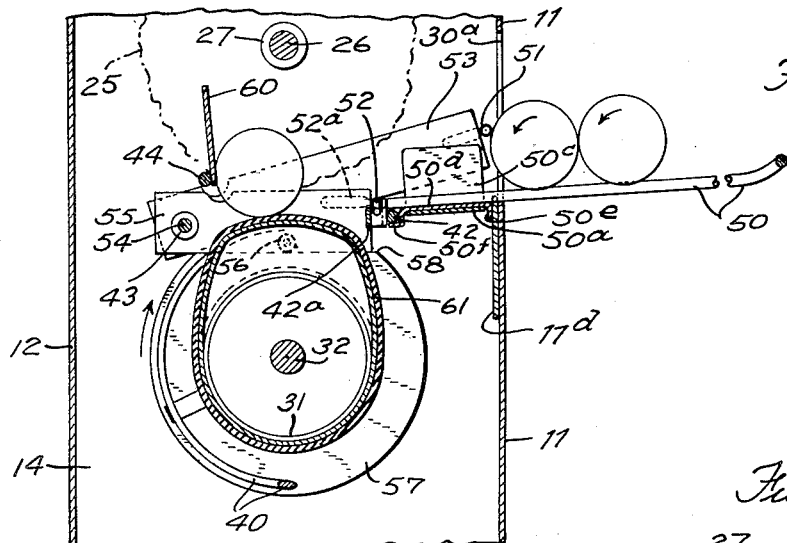
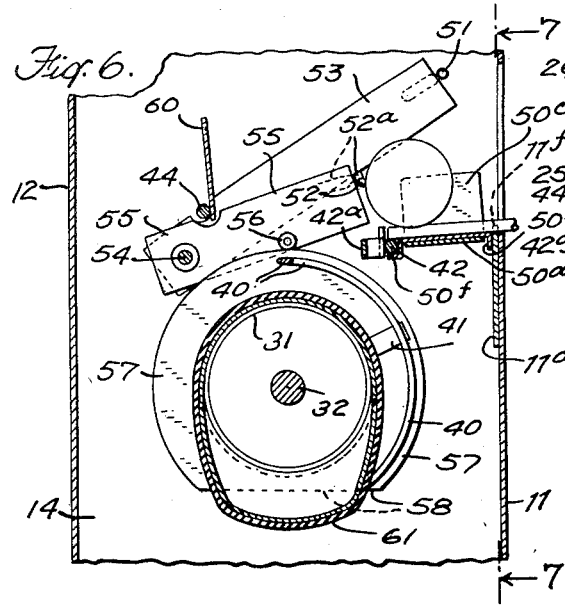
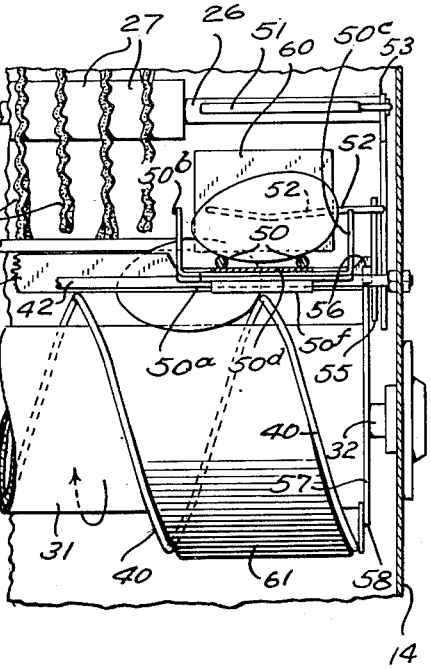
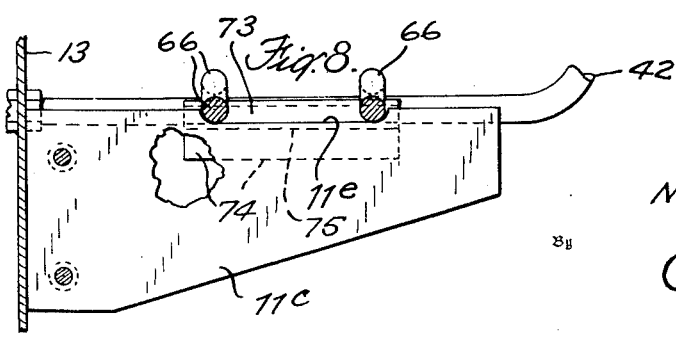
Inventor
NORBERT F. MARZOLF Patented Feb. 3, 1953

2,627,140

UNITED STATES PATENT OFFICE 2,627,140

EGG SCOURING MACHINE

Norbert F. Marzolf, Strykersville, N. Y., assignor, by mesne assignments, to Paul L. Marzolf, Strykersville, N. Y.

Application September 28, 1948, Serial No. 51,509

2 Claims. (Cl. 51—22)

This invention relates to a new and improved machine for washing eggs, and while it is designed and primarily intended for such use, it will be understood that the principles and features of design and construction which have made it successful for such use are capable of embodiment in machines for washing similar objects, such as various fruits, etc.

It has long been known that eggs as collected from the nests have the shells fouled. This fouling impairs the keeping quality and lowers the market value, because most purchasers are adverse to buying eggs in such condition.

I am aware that machines have been proposed in the past for washing eggs. As far as I know, however, such machines are designed and built to have a large capacity and are too bulky and expensive for use by any but large scale egg producers. Prior to my invention, no machines were available which the small operator could afford to buy and use.

The result of this has been that most eggs produced by small operators have been washed by hand, when washed at all. Such washing is a tedious, dirty and time-consuming job, and evidence appears to indicate that it is ineffective as far as concerns the keeping qualities of the eggs. It is known that if the natural bloom is removed from the shell in the washing process, the eggs do not keep as well. On the other hand, if the eggs are washed by hand by being scrubbed in a pail of water, while they may appear cleaner, actually they are not and such scrubbing simply distributes the fouling over all the eggs in an invisible coating.

It is an object of this invention to provide an egg washing machine which is sufficiently simple and economical to be used by egg producers who cannot afford the large capacity expensive machines now available.

It is a further object of this invention to provide a machine of the class described in which the eggs may be fed into the machine through an inlet opening, are carried through the machine and washed individually without attention by the operator, and are delivered into an outlet trough, from which they may be removed for packing.

It is a further object of the invention to provide a machine which is capable of handling the various sizes of eggs likely to be encountered, without sorting, or adjustment of the machine.

It is a further object of this invention to provide a machine of the class described with an escapement mechanism to admit one egg at a time, regardless of variation in the size of the eggs, which will handle them without danger of cracking or breakage, washing them in clean solution not previously used on other eggs, turning and washing all parts of the shell, and finally delivering them in an outlet trough ready for packing.

It is a further object of this invention to provide a machine of the class described which will remove the fouling from the shell without removing the bloom, leaving the egg in the best keeping condition and with the best appearance.

Still other objects and advantages of my invention will be apparent from the specification. The features of novelty which I believe to be characteristic of my invention are set forth with particularity in the appended claims. My invention itself, however, both as to its fundamental principles and as to its particular embodiments, will best be understood by reference to the specification and accompanying drawing, in which:

Fig. 3 is a top plan view partly in section;

Fig. 4 is a section on lines 4—4 of Fig. 2;

Fig. 5 is a section on lines 5—5 of Fig. 2, showing particularly the escapement which feeds the eggs in one at a time;

Fig. 6 is a similar view but showing the mechanism displaced 180° in its cycle from the position of Fig. 5;

Fig. 7 is a detail sectional elevation taken on line 7—7 of Fig. 6, showing the inlet portion of the mechanism from the front, and Fig. 8 is a fragmentary enlarged cross-sectional view taken on line 8—8 of Fig. 4.

Figure 1:
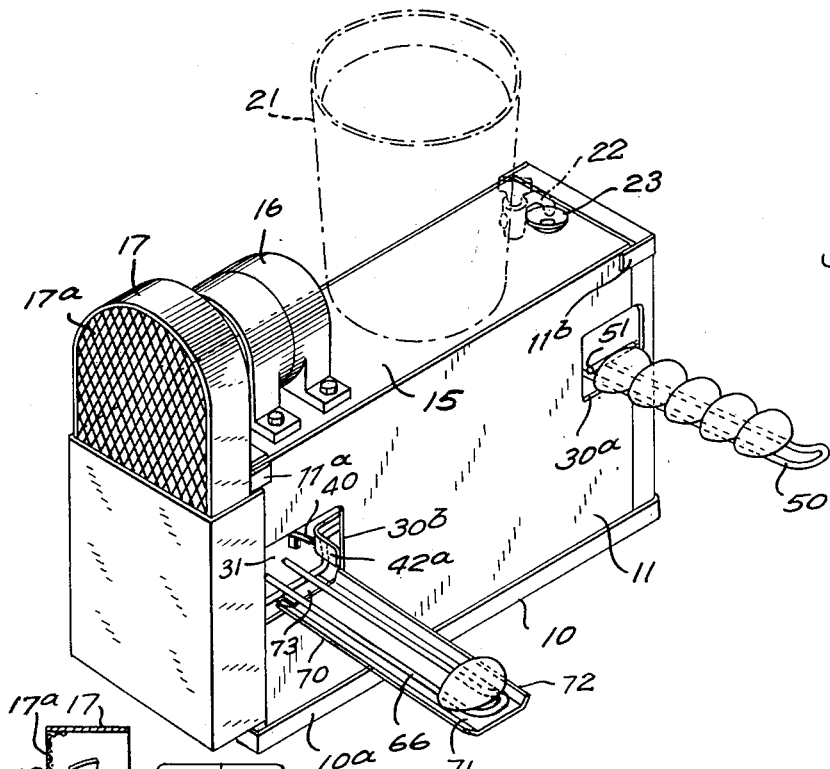
Fig. 1 is a perspective view of one form of machine according to my invention.
Figure 2:
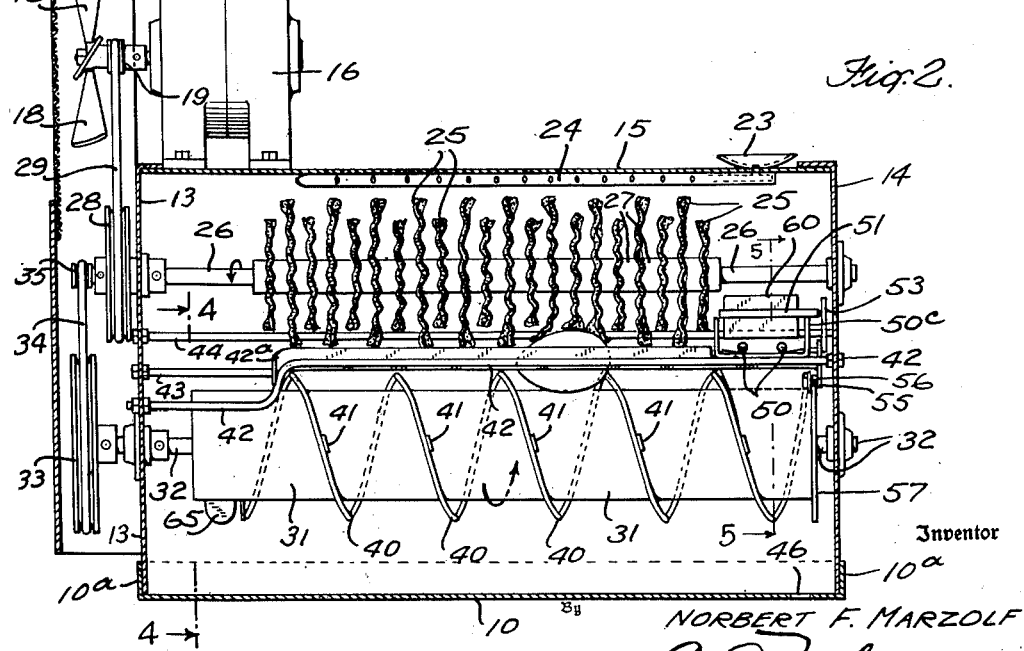
Fig. 2 is a front elevation partly in section.

Referring now more particularly to the drawing, the embodiment of the machine herein described, which is for certain purposes the preferred form, is provided with a base 10, front and rear walls 11 and 12, end walls 13 and 14, and a top 15. The front wall 11 has inlet and outlet openings 30a and 30b respectively, and both front and back walls are removable and are held in position by being inserted inside of flange 10a on the base, and fingers 11a and 11b mounted on the end plates 13 and 14. At one end of the top 15 I mount an electric motor 16 which drives the machine. The shaft of the motor projects into a housing 17 having a grill 17a and carries a fan 18 for cooling the motor in operation, and a pulley 19 for delivering power to the egg conveyor and scrubber. The top 15 supports a container 21 charged with the solution used in washing the eggs. Container 21 has faucet 22 permitting flow of the solution from the container into funnel 23, which feeds a perforated pipe 24, extending longitudinally of the machine under the top 15.

The solution drips from the pipe 24 on a series of scrubber disks 25. These disks are usually fabric, coated with an abrasive such as sea sand held in place by waterproof glue, and are limp and flexible, so that they yield, to permit passage of the eggs along the conveyor. They are preferably mounted in spaced relation on shaft 26, mounted in bearings in the opposite end plates 13 and 14, and spaced apart by spacers 27. Preferably they are of different diameters, alternately.

The scrubber shaft 26 is, in this embodiment of the invention, driven by pulley 28 which carries belt 29 passing over the motor shaft pulley 19. The drive pulley is smaller than the driven pulley so that the scrubber shaft 26 rotates slower than the motor 16.

The eggs pass into the machine at the inlet opening 30a in the front wall 11, and are permitted to move, one by one, onto rotary cylindrical conveyor 31, mounted on shaft 32 journalled in bearings carried by the end walls 13 and 14. The conveyor 31 is mounted under the shaft 26, but close enough to it so that eggs passing down the conveyor are scrubbed by the disks 25. Shaft 32 is driven by pulley 33 carrying belt 34 which is driven by pulley 35 on scrubber shaft 26. These pulley sizes are so chosen that the conveyor 31 rotates considerably slower than scrubber shaft 26.

The conveyor 31 is preferably covered with a surface layer of rubber or like material to provide friction to rotate the eggs as they pass along, and surrounding the conveyor 31 and spaced outwardly therefrom I prefer to provide a helix of relatively heavy wire 40, held in position on the conveyor by a series of spacer fingers 41, secured to the conveyor 31 and the wire 40. The convolutions of the helix 40 are so spaced as to admit the largest egg, likely to be encountered, between adjacent turns. Front and rear guard rails 42, 43 and 44 are preferably provided above and on either side of the conveyor to confine the eggs to a path on top of the conveyor 31, where they are engaged by the scrubber disks 25 in their passage through the machine, and the front guard rail carries a vertical guard fin or strip 42a throughout most of its length. The left hand end of guard rail 42 is offset downwardly and outwardly at its left hand end to permit the eggs to pass out of the exit opening 30b. The right hand end of the guard rail 42a is cut away to provide easy passage of the eggs from the inlet trough 50 to the conveyor 31. The guard strip 42a terminates at the offset point as best seen in Figs. 3 and 4.

As the eggs pass down the conveyor, they are rotated by engagement with the conveyor surface and pushed along by the helix 40 so that every portion of the shell is subjected to the scrubbing action of the disks 25. The washing solution, which has dripped onto the scrubber disks 25, trickles down over the egg, thence down to the base of the machine, where it may be allowed to drain off into a suitable receptacle, or drain, through opening 46.

The mechanism which admits the eggs, one at a time, will now be described. The inlet trough 50 is preferably formed by bending a relatively heavy rod into an elongated U shape, with the base of the U portion turned up slightly. The trough is provided at its inner end with a flat strip 50a, having its ends turned up at 50b and 50c to confine the eggs and prevent them dropping into the casing before they reach the conveyor. Also, secured to strip 50a is a second strip 50d, having its outer end turned down, as at 50e, and its inner end downwardly offset as at 50f, which engages the underside of the guard rail 42. In assembling the rod and strips 50a and 50d, 50d is first attached, and then 50a is attached.

Triangular bracket plates 11c and 11d, having their upper edges notched as at 11e and 11f, project from end walls 13 and 14 just below the inlet and outlet openings 30a and 30b. The inlet trough is removable, and is positioned by being inserted through the inlet opening, with the downwardly offset end, 50f, under the front guard rail 42, and the bars of the trough resting in notch 11f on the top of bracket 11d. When inserted, it has a slight rearward tilt so that the eggs roll by gravity into the machine.

Outlet trough 66 is somewhat similar to inlet trough 50, and is formed of heavy rod bent to an elongated U-shape with its outer end turned up slightly. Pan 70 having upturned sides 71 and 72 is secured to the bar, and at the inner end is a strip 73, having its forward end bent down at 74 and its rear end downwardly offset at 75.

The outlet trough is positioned by inserting the inner end through the outlet opening 30b, resting in notch 11e in bracket 11c with guard rail 42 between offset 75 and the ends of the bar, and the downturned end 74 behind bracket 11c. It preferably has a slight tilt downward toward the outer end when assembled.

The outer escapement finger 51 is preferably a rubber covered finger mounted on oscillating finger carrier 53 pivoted at 54 through collar 54a secured to finger carrier 53 on guard rail 43 adjacent end wall 14, and extends perpendicularly from the finger carrier. The inner escapement finger 52 is similarly mounted on the outer end of another oscillating finger carrier 55, likewise pivoted at 54. The finger carrier 55 has a roller or cam follower 56 which rides on the periphery of cam 57, mounted on conveyor shaft 32, having a flat portion 58 covering about 90° of its periphery.

Except when the follower 56 is in contact with flat portion 58, the roller 56 is at the vertical extent of its travel, in the position shown in Fig. 6, with the inner finger 52 in front of the first egg, and the outer finger 51 raised out of the way of the second egg. Arm 53, it will be noted, is raised when arm 55 is raised, by the engagement of the rearwardly projecting end of finger 52 under the lower edge of plate 53, as shown in Figs. 5, 6 and 7.

When follower 56 reaches flat portion 58 of cam 57, both plates 55 and 53 are permitted to rotate slightly clockwise, by gravity, to the position shown in Fig. 5, releasing the first egg to pass onto the conveyor, against back stop plate 60. Repeated rotation of the conveyor shaft repeats this cycle, permitting the eggs to roll, one by one, onto the conveyor. It will be noted that the second egg is not released to pass onto the conveyor until the first egg has advanced one turn of the helix down the conveyor. Thus, the eggs cannot strike one another, eliminating danger of cracking.

It will be observed from Fig. 3 that the level at which the egg travels along most of the conveyor is somewhat below the level at which the egg passes off the inlet trough. To prevent the eggs dropping, with the consequent danger of breakage, the inlet portion of the conveyor on to which the egg rolls is enlarged over about half its diameter, as will be clear from Figs. 5, 6 and 7. The enlarged portion is designated as 61 and leads to a circumference, of approximately 90° angular extent circumferentially, of enlarged diameter to receive the egg as it moves off the inlet trough, and against back plate 60. As the conveyor rotates, the egg rolls smoothly down the sloping portion to the portion of smaller diameter.

Eggs cannot fall off the inlet trough when this enlarged diameter portion is not in place to receive them, because the inner escapement finger 52 is raised except when this enlarged portion is in correct position, and this blocks the entry of eggs to the conveyor.

As the eggs reach the end of the conveyor, they ride against the projecting finger 65 (best shown in Fig. 4), which may be riveted to the conveyor tube (see also Fig. 3), which pushes the egg off the conveyor into outlet trough 66, already described.

In the specification I have particularly pointed out and distinctly claimed the part, improvement, or combination which I claim as my invention or discovery, and I have explained the principles thereof, and the best mode in which I have contemplated applying those principles, so as to distinguish my invention from other inventions.

While I have shown and described certain preferred embodiments of my invention, it will be understood that modifications and changes may be made without departing from the spirit and scope thereof, as will be clear to those skilled in the art.

I claim:

1. In mechanism of the class described, in combination, a frame, a rotary screw conveyor journalled in said frame with its axis horizontal, a scrubber shaft carrying flexible scouring means of sufficient size to touch objects traveling on said conveyor journalled in said frame in parallel spaced relation to the axis of said conveyor and extending longitudinally thereof, an inlet trough at one end of said conveyor, an outlet trough at the other end thereof, and means for admitting objects to be washed from said inlet trough to said conveyor one at a time, said means including a pair of fingers movable into and out of the path over said trough to said conveyor, said fingers being disposed longitudinally of said path, and operable alternately into and out of said path, in such a manner that one of said fingers is always in said path.

2. In mechanism of the class described, in combination, a frame, a rotary screw conveyor journalled in said frame, a scrubber shaft carrying flexible scouring means of sufficient size to touch objects travelling on said conveyor journalled in said frame in spaced parallel relation to the axis of said conveyor and extending longitudinally of said conveyor, an inlet at one end of said conveyor, an outlet at the other end thereof, and means for admitting objects to be washed from said inlet to said conveyor one at a time, said means including a pair of fingers disposed one behind the other along the line of the inlet path over said conveyor, with one of said fingers blocking said path, and means driven in synchronism with said conveyor for moving both said fingers to cause the blocking finger to open the path and the other finger to block said path, said last mentioned means including a cam mounted at one end of said conveyor and synchronized therewith and a cam follower driven by said cam and driving said fingers.

NORBERT F. MARZOLF.

REFERENCES CITED

The following references are of record in the file of this patent:

UNITED STATES PATENTS

| Number | Name | Date |
| --- | --- | --- |
| 317,601 | Welker | May 12, 1885 |
| 503,210 | Learned | Aug. 15, 1893 |
| 1,248,051 | Agnew | Nov. 27, 1917 |
| 1,530,415 | Roussel | Mar. 17, 1925 |
| 2,005,115 | Stutz | June 18, 1935 |